UNITED STATES PATENT OFFICE.

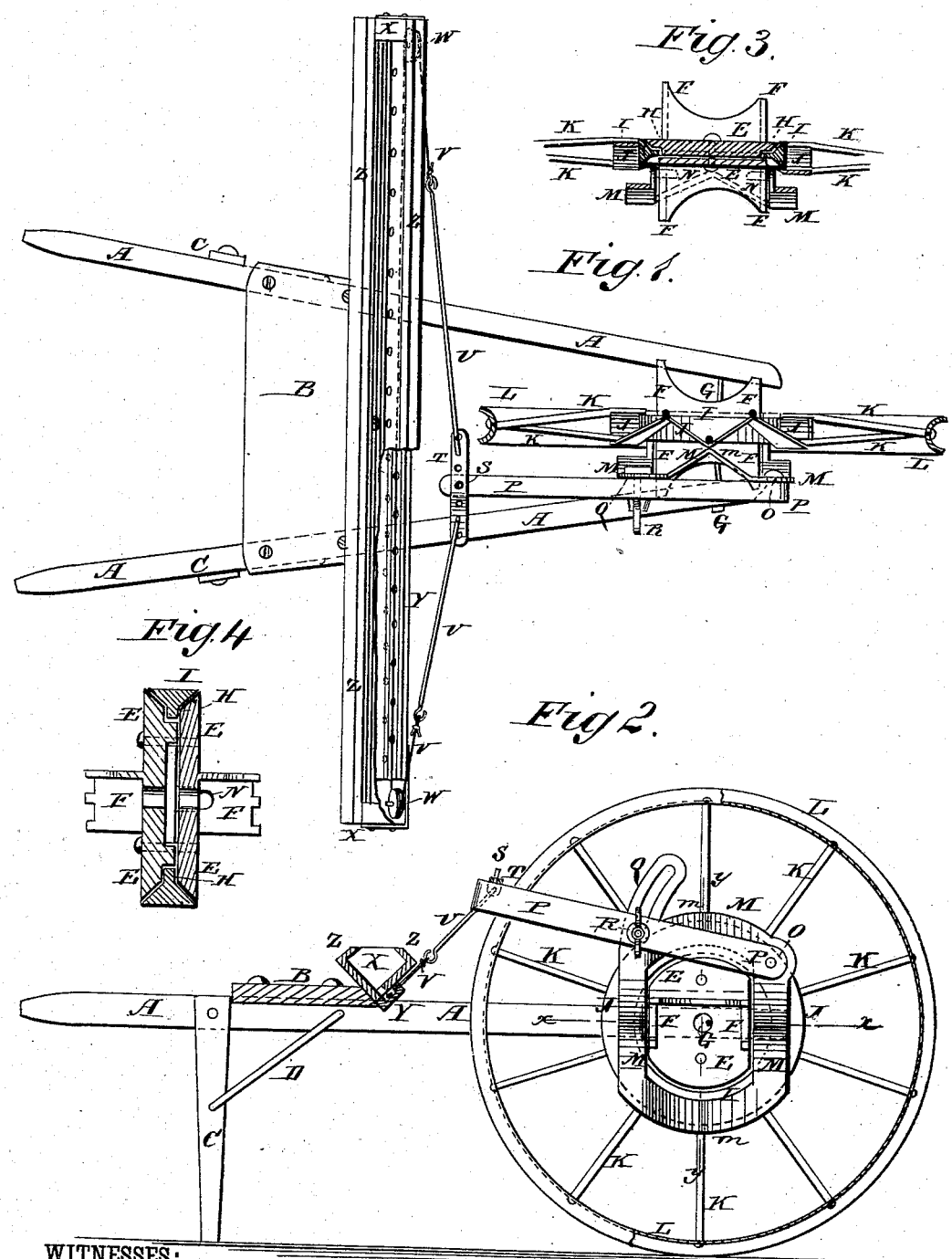

MASON GIBBS, OF HOMER, MICHIGAN.

SEED-SOWER.

SPECIFICATION forming part of Letters Patent No. 238,040, dated February 22, 1881.

Application filed November 17, 1880. (Model.)

*To all whom it may concern:*

Be it known that I, MASON GIBBS, of Homer, in the county of Calhoun and State of Michigan, have invented a new and useful Improvement in Seed-Sowers, of which the following is a specification.

Figure 1 is a plan view of the improvement, partly in section. Fig. 2 is a side elevation, partly in section. Fig. 3 is a horizontal section of the middle part of the drive-wheel and its supports, taken through the line $x\ x$, Fig. 2. Fig. 4 is a vertical section of the middle part of the drive-wheel and its supports, taken through the line $y\ y$, Fig. 2.

The object of this invention is to furnish seed-sowers for sowing clover-seed, timothy-seed, and other fine seeds, which shall be so constructed as to sow the seed uniformly, and which can be readily adjusted to sow any desired quantity of seed to the acre.

Similar letters of reference indicate corresponding parts.

A are two bars, which incline toward each other in the manner of the side bars of a wheelbarrow-frame, and which are connected at a little distance from their rear ends or handles by a cross bar or board, B.

To the rear parts of the side bars, A, are attached the upper ends of two legs, C, which are strengthened in place by braces D, as shown in Fig. 2.

E are two circular plates, which are securely bolted together.

To the outer sides of the plates E are rigidly attached, or upon them are formed, flanges F, the rear ones of which are made the longer, to correspond with the inclination of the bars A. The outer edges of the flanges F are notched or recessed, to receive and fit upon the side bars, A, and may be provided with points at the centers of the said notches or recesses, to enter recesses in the side bars, A, and thus prevent the said flanges from slipping out of place. The bars A and the plates E and their flanges F are fastened together by a long bolt, G, passing through the said bars A and through a hole in the said plates E. One or both the plates E are rabbeted upon the inner side of their edges, to form a seat for the ring-flange H, formed upon the center of the inner surface of the band I. The edges of the plates E are beveled upon the inner side, to form a seat for the beveled edges of the band I, so that the said band and flange can revolve freely upon the plates E, and will be kept securely in place upon the said plates.

To the outer side of the band I is securely attached, or upon it is formed, a zigzag flange, J, which should be made with an uneven number of angles, and to it, upon one side, are attached the inner ends of the spokes K.

To the outer ends of the spokes K is attached a rim, L, which is concaved upon the outer side, as shown in Fig. 1, to prevent it from sinking into loose soil. The ends of the spokes K project into the cavity of the rim L, to prevent the wheel from slipping upon the soil.

M is a frame or skeleton-plate, upon the upper and lower bars of which are formed inwardly-projecting angles $m$, to correspond with the angles of the zigzag flange J. To the middle parts of the side bars of the frame M are attached, or upon them are formed, pivots N, which work in sockets in the flange F or plate E, as shown in Figs. 3 and 4. With this construction the frame M will be rocked upon its pivots N by the revolution of the drive-wheel, the upper angle, $m$, of the frame M entering an angle of the zigzag flange J as the lower angle, $m$, of the said frame passes up a salient angle of the said zigzag flange J.

To the forward upper corner of the frame M is pivoted, by a bolt, O, the forward end of the lever or bar P.

Upon the rear upper corner of the flange M is formed an arm, Q, which projects upward and is curved forward upon the arc of a circle having its center at the bolt O. The curved arm Q is slotted longitudinally, to receive the bolt R, which also passes through the lever P, and has a hand-nut screwed upon its forward end. With this construction, by loosening the nut of the bolt R, the rear part of the lever P can be raised and lowered, to bring its rear end farther from and closer to the axial line of the frame M, so that a greater or less movement or throw will be given to the said rear end of the lever P by the rocking of the said frame M, as may be desired.

To the upper side of the rear end of the lever P is attached a pivot, S, upon which is placed a cross-bar, T. In the center of the cross-bar T is formed a hole to receive the pivot S, and in its end parts are formed a number of holes, to receive the hooks formed upon the inner ends of the rods U, to the outer ends of which are attached the ends of a cord, V. The cord V passes around guide-pulleys W, pivoted to the ends of the rear side of the long seed-box X. The cord V passes through a longitudinal groove formed in the inner side of a strip, Y, attached to the rear side of the seed-box X, and in the strip Y are formed rows of holes, the holes in the said strip being about midway between the holes in the side of the seed-box, so that the seeds will be forced out in uniform quantities through the holes in the said strip by the longitudinal movement of the cord V. The amount of seed sown to the acre depends upon the length of movement given to the cord V, which movement is regulated by adjusting the lever P upon the curved arm Q, as hereinbefore described. The seed-box X is made V-shaped in its cross-section and of any desired length, and is securely attached to the frame A B A.

Along the upper edges of the sides of the seed-box X are formed inwardly-projecting flanges Z, to prevent the seed from shaking out when the sower is being used. The flanges Z are formed in one piece with the sides of the seed-box X, by planing or otherwise working down or cutting out the said sides. By this construction there will be but one joint in the seed-box, so that the said box will not be liable to open at the joints and allow seed to escape.

Having thus fully described my invention, I claim as new and desire to secure by Letters Patent—

1. In a seed-sower, the combination, with the frame A and the wheel provided with the bevel-band I, of the bevel-plates E, provided with flanges F and clamped together, and the bolt G, whereby the said plates are clamped between the said bars and the band adapted to revolve upon them, substantially as and for the purpose set forth.

2. In a seed-sower, the combination of the circular rabbeted edge-beveled plates E, provided with unequal notched flanges F, having points that enter recesses of side bars, A, the bevel-edged band I, having the ring-flange H and zigzag flange J, and the skeleton-plate M, having angles $m$, and carrying pivots N, working in sockets of a plate, E, or flange F, as and for the purpose described.

3. The combination, in a seeder, with rocking plate M, having curved slotted arm Q, the lever P, bolt R, the cross-bar T, and pivot S, having several holes, of the rods U, cord V, and grooved strip Y, the latter arranged on seed-box and having several rows of holes, as shown and described.

MASON GIBBS.

Witnesses:
ALBERT V. PARKS,
WELLS PRATT.